(12) United States Patent
Arlt et al.

(10) Patent No.: US 6,683,153 B1
(45) Date of Patent: Jan. 27, 2004

(54) THERMAL SEPARATION METHOD FOR MIXED POLYMERS

(75) Inventors: Wolfgang Arlt, Hohen Neuendorf (DE); Gabriele Sadowski, Honow (DE); Stefan Behme, Berlin (DE); Bernd Bungert, Hofheim (DE)

(73) Assignee: Der Grune Pukt - Duales System Deutschland AG, Cologne (DE)

( * ) Notice: Subject to any disclaimer, the term of this patent is extended or adjusted under 35 U.S.C. 154(b) by 0 days.

(21) Appl. No.: 10/048,850

(22) PCT Filed: Aug. 6, 1999

(86) PCT No.: PCT/EP99/05809

§ 371 (c)(1),
(2), (4) Date: Aug. 15, 2002

(87) PCT Pub. No.: WO01/10943

PCT Pub. Date: Feb. 15, 2001

(51) Int. Cl.[7] .................................................. C08F 6/00
(52) U.S. Cl. ........................ 528/480; 422/122; 422/901
(58) Field of Search .......................... 528/480; 422/122, 422/901

(56) References Cited

U.S. PATENT DOCUMENTS 6,175,409 B1 * 1/2001 Nielsen et al. .............. 356/337

FOREIGN PATENT DOCUMENTS

| DE | 26 39 864 | 3/1977 | ............ C08J/11/04 |
| DE | 28 01 522 | 7/1979 | ............ C08L/23/02 |
| DE | 41 17 751 | 12/1992 | |
| DE | 196 53 076 | 6/1998 | |
| DE | 197 14 063 | 10/1998 | ............ B01D/15/08 |
| DE | 198 06 355 | 8/1999 | ............ C08J/11/08 |
| EP | 0 491 836 | 5/1996 | |
| EP | 0 894 818 | 2/1999 | ............ C08J/11/08 |
| JP | 06298992 | * 10/1994 | |
| WO | WO 91/03515 | 3/1991 | |

OTHER PUBLICATIONS

Patent Abstracts of Japan vol. 1995, No. 01, Feb. 28, 1995 & JP 06 298992 A (SEKITEI BEIKOKU:KK), Oct. 25, 1994 Abstract.
J. Gmehling and B. Kolbe, "Thermodynamics," VCH, second edition (revised).
B. Bungert, G. Sadowski, W. Arlt, "Supercritical antisolvent fractionation: measurements in the systems monodisperse and bidisperse polystyrene—cyclohexane—carbon dioxide," *Fluid Phase Equilibria* 139 (1997), pp. 349–359.
S. Krause, "Polymer Compatibility," *J. Macromol. Sci.—Revs. Macromol. Chem*, C7(2), pp. 251–314 (1972).

* cited by examiner

*Primary Examiner*—Terressa M. Boykin
(74) *Attorney, Agent, or Firm*—Aslan Baghdadi; Shaw Pittman LLP

(57) ABSTRACT

A method for separating technical and biological polymers by generating two liquid phases using an added gas or an adjusted temperature. The separated polymers are obtained in solution with a high degree of purity. Complete separation can be achieved by subsequently performing liquid chromatography during which the corresponding trace component irreversibly adheres to the column while the other trace component is not retarded.

20 Claims, 3 Drawing Sheets

THERMAL SEPARATION METHOD FOR MIXED POLYMERS

BACKGROUND

1. Field of the Invention

The present invention relates to polymer recycling, and in particular, to a method for separating technical and biological polymers by means of liquid-liquid separation.

2. Background of the Invention

Polymer recycling involves separating polymers. This separation could mean: (1) the separation of polymers of one type according to molecular weight; or (2) the separation of different types of polymers (for example polystyrene and polyester) regardless of molecular weight.

Polymers, in this case technical polymers, are large-scale products in the chemical industry with production reaching approximately 6.4 million tons in 1990. By far the majority of the produced polymers are thermoplastics, in other words, polymers with finite molecular weight. Thermoplastics represent approximately 90% of the produced amount and can be subdivided into approximately 11 different chemical types such as, for example, polyvinyl chloride, polystyrene, polyolefin, polyester, copolymers and so forth. Recycling depends on whether the different types that form part of mixed waste, can be separated into pure substances since mixed polymers usually do not result in a high quality product.

The recycling can be performed in accordance with the following methods:

Thermal recycling: In other words, combustion of the mixed waste for the extraction of the combustion heat. This method converts the polymers into the substances $CO_2$ and $H_2O$, which are basically not suitable for further synthesis.

Recycling according to type: This type of recycling is usually reserved for the processor, since commercial polymers usually are mixed.

Mechanical separation: This method takes advantage of the different polymer densities or the different wetting characteristics of the polymers. It is not suitable for hollow or mechanically connected parts consisting of different polymers nor for polymers that contain additives (softeners, flame-retardants and others).

Type recognition mechanical separation: This method relies on fast analysis methods that recognize the polymer type and sort the recognized parts. This method is not suitable for mechanically connected parts consisting of different polymers.

A common disadvantage of all the above-mentioned separation methods is the fact that they cannot respond to the additives and auxiliary agents nor decomposed polymers that are often present (for example as a result of the use of UV radiation).

Thermal separation methods should also be considered for polymer separation. Due to the very low vapor pressure of polymers, distillation cannot be considered, leaving extractive and adsorptive methods as possibilities.

SUMMARY OF THE INVENTION

When examining the solubility of a polymer in a solvent it becomes apparent that it is very dependent on both the temperature and the molecular weight of the polymer. FIG. 1 illustrates this correlation.

In FIG. 1, the polymer concentration in a solvent (0 to 100%) is plotted against temperature. The marked two-phase boundaries (1) and (2) separate a region of total miscibility (4) from the regions (3) or (5) of separation into two liquid phases, one of which is rich in solvent and the other is rich in polymers. It is generally accepted that two separation areas exist, one at lower temperatures (3) and one at higher temperatures (5). An increase in polymer molecular weight leads to an expansion of the two-phased separation and, in extreme cases, leads to the formation of a single connected two-phase area (watch-glass diagram).

For technical separation tasks, separation at higher temperatures is particularly interesting, since at lower temperatures and with high polymer content (> 20 wt. % polymer), the viscosity of the solution is very high, which leads to difficulties with material transfer and heat transfer and hence leads to higher costs (high-viscosity technique). The two-phase area (5) can be shifted to lower temperatures (see, for example, B. Bungert, G. Sadowski, W. Arlt, *Fluid Phase Equilibria* 139 (1997) 349–359) by compressing a gas, which is particularly useful for thermally unstable polymers. In this manner, the advantages of low viscosity can be combined with the advantage of lower temperature requirements. An additional advantage when using a compressed gas is that, as opposed to liquid precipitants (through the use of which a separation also could be achieved), it can be quasi-quantitatively removed from the system when the pressure is lowered, eliminating the need for additional processing steps such as, for example, distillation.

If two polymers in one common solvent are examined, a segregation into two liquid phases usually occurs as soon as the total polymer content reaches a value of 5–10 wt. % even when both the pure polymers are completely soluble in the solvent being examined (see, for example, S. Krause, *J. Macromol. Sci.—Revs. Macromol. Chem.*, C7(2), (1972) 251–314). FIG. 2 illustrates these interrelations using a triangle diagram. The triangle diagrams of FIG. 2 and 3 are in accordance with J. Gmehling, B. Kolbe, *Thermodynamics*, $2^{nd}$ edition, Weinheim 1992.

Referring to FIG. 2, while the corners of the triangle represent the pure substances polymer P1, polymer P2 and the solvent LM, the sides of the triangle represent the corresponding binary subsystems. All possible concentrations of the ternary system polymer P1/polymer P2/solvent LM are located within the triangle surface. Line 8 separates the area of complete miscibility (9) from the area (10) of separation into liquid phases. In area 10, two phases are formed that contain mainly one of the respective polymers as well as additional detectable amounts of the other polymer. A polymer separation with a high degree of purity (>99%) taking advantage of this segregation is theoretically possible when working with total polymer content of between 30–50 wt. %. In practice, however, it is not feasible since when doing this, two (or more) phases are obtained, each with a high polymer content. These phases are so viscous that a mechanical separation of the phases is not possible.

WO091/03515 to E. B. Nauman describes a method for the selective dissolving of a polymer mixture using a specifically chosen solvent. The disadvantages of this method are the extensive use of solvent, low selectivity and over sensitivity with regard to the molecular weight of the polymer. Additionally, the dissolving and separation of the polymers is only partially successful due to the high viscosity in the solution. Nauman himself points out that the method is not suitable for composite materials consisting of different polymers.

An additional thermal separation method is liquid chromatography that can be controlled in such a way that a separation of polymers is achieved regardless of molecular weight (see, for example, W. Arlt, A. Lawisch, German Patent Application, File No. 197 14063.7-41). The separation of one polymer type is achieved using distribution between a mobile and a stationary phase. Such a chromatography installation consists of the following parts: machine used to maintain the flow of the mobile phase; feeder device for the substances that are to be separated; column with the stationary phase; detector for the polymer types that are to be separated. The described installation configuration is employed for analytical purposes and under certain circumstances also for technical separation. In this connection, the column material, solvent and elution agent must be chosen in such a manner that the retention times for all types are finite, in other words, so that none of the types irreversibly adhere to the column (again, see, for example, W. Arlt, A. Lawisch, German Patent Application, File No. 197 14063.7-41). The limitations of this method are that it is necessary to work with very dilute solutions because of the modest simultaneous solubility of several of the polymers in the common solvent at simultaneous high viscosity, which affects costs.

The method according to the invention offers a significant improvement over prior methods in that it uses a two-stepped liquid phase separation in which at most one of the phases has higher viscosity. The fundamental principle of the method is described in the Detailed Description for two polymers for the sake of clarity, but is also applicable for more than two polymers.

A first embodiment of the present invention provides a method for the separation of technical or biological polymer mixtures as follows:

the polymers are technical or biological macro molecules with a number average molecular weight of greater than 1000 g/mol and less than 1000 kg/mol and are at least partially soluble in at least one suitable solvent;

the mixtures are not completely miscible in the melt;

the above-mentioned mixtures are dissolved in a solvent or solvent mixture in such a manner that the solution contains 1–50 wt. %, preferably 5–25 wt. % total polymer and such that at least two liquid phases are formed;

the solvent or solvent mixture has an atmospheric boiling point between 30° C. and 250° C.;

by decanting the liquid phases, homogenous fractions are formed in which a polymer or a group of chemically similar polymers (target polymer) is present in increased concentration;

the homogeneous fractions are subjected to pressures and temperatures, at which the pure target polymer with the solvent form two liquid phases so that the fractions separate into at least two phases of which the first is a liquid polymer rich phase that contains the target polymer with an even higher degree of purity and the second of which is a polymer poor liquid phase; and the polymer rich phase is separated and the target polymer is extracted with an even greater degree of purity.

A second embodiment of the present invention provides a method for the separation of technical or biological polymer mixtures as follows:

the polymers are technical or biological macro molecules with a number average molecular weights of greater than 1000 g/mol and less than 1000 kg/mol and that they are at least partially soluble in at least one suitable solvent;

the mixtures in the melt are not completely miscible;

the above-mentioned mixtures are dissolved in a solvent or solvent mixture in such a manner that the solution contains 1–50 wt. %, preferably 5–25 wt. % total polymer and such that at least two liquid phases are formed;

the solvent or solvent mixture has an atmospheric boiling point between 30° C. and 250° C.;

by decanting the liquid phases, homogenous fractions are formed in which a polymer or a group of chemically similar polymers (target polymer) is present in increased concentration;

one or more fractions is mixed with a compressed gas or gas mixture to achieve the forming of two or more liquid phases so that the fractions are separated into at least two liquid phases, the first of which is a polymer-rich phase that contains the target polymer with an even higher degree of purity, and the second of which is a polymer-poor liquid phase; and the gas is a substance or a substance mixture that is available at 1 bar absolute and at 25° C. in a gaseous state.

A third embodiment of the present invention provides a method for the separation of technical or biological polymer mixtures as follows:

the polymers are technical or biological macro molecules with a number average molecular weight of greater than 1000 g/mol and less than 1000 kg/mol and that they are at least partially soluble in at least one suitable solvent;

the mixtures in the melt are not completely miscible;

the above-mentioned mixtures are dissolved in a mixture consisting of at least one solvent and one gas, in such a manner that the solution contains 1–50 wt. %, preferably 5–25 wt. % total polymer, and such that at least two liquid phases are formed;

the solvent or solvent mixture has an atmospheric boiling point between 30° C. and 250° C.;

by decanting the liquid phases, homogenous fractions are formed in which a polymer or a group of chemically similar polymers (target polymer) is present in increased concentration;

one or more fractions are mixed with another compressed gas or gas mixture;

the gas is a substance or a substance mixture that is available at 1 bar absolute and at 25° C. in a gaseous state;

the fractions obtained in accordance with step (f), are subjected to pressures and temperatures at which the pure target polymer with the solvent form two liquid phases so that the fractions separate into at least two liquid phases, the first of which is a polymer-rich phase that contains the target polymer in an even higher degree of purity, and the second of which is a polymer-poor phase; and the polymer-rich phase is separated and the target polymer is extracted with an even higher degree of purity.

A fourth embodiment of the present invention provides a method for the separation of technical or biological polymer mixtures as follows the polymers are technical or biological macro molecules with a number average molecular weight of greater than 1000 g/mol and less than 1000 kg/mol and that they are soluble in at least one suitable solvent;

the mixtures in the melt are not completely miscible;

the above-mentioned mixtures are dissolved in a solution or solution mixture in such a manner that the homogeneous solution contains 1–50 wt. %, preferably 5–25 wt. % total polymer;

the solvent or solvent mixture has an atmospheric boiling point between 30° C. and 250° C.;

the solution is exposed to rising temperatures so that the polymers in the solution are subjected to the following subsequent steps:

ea) the temperature, above which the respective polymer with the pure solvent forms two liquid phases, is exceeded so that the solution separates into at least two liquid phases, the first of which is a liquid polymer-rich phase that contains the respective enriched polymer (target polymer) and the second of which is a polymer-poor phase;

eb) the polymer-rich phase is separated and the target polymer is extracted with a higher degree of purity; and ec) the polymer-poor phase is subjected to steps (ea) to (eb) until all desired polymers are separated.

A fifth embodiment of the present invention provides a method for the separation of technical or biological polymer mixtures as follows:

the polymers are technical or biological macro molecules with molecular weight of greater than 1000 g/mol and less than 1000 kg/mol and that they are soluble in at least one suitable solvent;

the mixtures in the melt are not completely miscible;

the above-mentioned mixtures are dissolved in a solvent or solvent mixture in such a manner that the homogenous solution contains 1–50 wt. %, preferably 5–25 wt. % total polymer and such that at least two liquid phases are formed;

the solvent or solvent mixture has an atmospheric boiling point between 30° C. and 250° C.;

the solution is exposed to falling temperatures so that the polymers in the solution are subjected to the following subsequent steps:

ea) the temperature fall below the point at which the respective polymer with the pure solvent forms two liquid phases, so that the solution separates into at least two liquid phases, the first of which is a polymer-rich phase that contains the respective enriched polymer (target polymer) and the second of which is a polymer-poor phase;

eb) the polymer-rich phase is separated and the target polymer is extracted with a higher degree of purity; and ec) the polymer-poor phase is subjected to steps (ea) to (eb) until all desired polymers are separated.

A sixth embodiment of the present invention provides a method for the separation of technical or biological polymer mixtures as follows the polymers are technical or biological macro molecules with a number average molecular weight of greater than 1000 g/mol and less than 1000 kg/mol and that they are soluble in at least one suitable solvent;

the mixtures in the melt are not completely miscible;

the above-mentioned mixtures are dissolved in a solvent or solvent mixture in such a manner that the homogenous solution contains 1–50 wt. %, preferably 5–25 wt. % total polymer;

the solvent or solvent mixture has an atmospheric boiling point between 30° C. and 250° C.;

the solution is exposed to a constant portion of a compressed gas or gas mixture (gas content) and rising temperature, or is mixed with increasing portions of a compressed gas or gas mixture (gas content) at a constant temperature, so that the polymers in the solution are subjected to the following subsequent steps:

ea) the temperature or the gas content, above which the respective polymer with the pure solvent and gas or gas mixture forms two liquid phases, is exceeded so that the solution separates into at least two phases, the first of which is a liquid polymer-rich phase that contains the respective enriched polymer (target polymer) and the second of which is a liquid polymer-poor phase;

eb) the polymer-rich phase separates and the target polymer is extracted with a higher degree of purity;

ec) the polymer-poor phase is exposed to the steps in accordance with characteristics (ea) to (eb) until all desired polymers are separated; and the gas is a substance or a substance mixture that is available at 1 bar absolute and at 25° C. in a gaseous state.

A seventh embodiment of the present invention provides that, in any of the methods of the first six embodiments, the polymers to be separated are co-polymers with various co-monomer content.

An eighth embodiment of the present invention provides that, in any of the methods of the first seven embodiments, the short chain content of the molecular weight distribution of the enriched polymer accumulates with an increased degree of purity in the solvent-rich phase and therefore is depleted in the polymer-rich phase.

A ninth embodiment of the present invention provides that, in any of the methods of embodiments one, two, or three, after the first decanting step, the homogeneous fraction which contains a single polymer or a group of chemically similar polymers, after drying of the initial solvent or without any other processing, is dissolved in another solvent or solvent mixture.

A tenth embodiment of the present invention provides that, in any of the methods of embodiments two, three, and six, the gas content and the temperature are chosen in such a manner that the time needed until 99 wt. % of the substances have settled in phases has been reduced to under 20 minutes.

An eleventh embodiment of the present invention provides that, in any of the methods of embodiments one through ten, the polymers are thermoplastics or their mixtures.

A twelfth embodiment of the present invention provides that, in any of the methods of embodiments one through ten, the polymers are polystyrene, polyvinyl chloride, polyolefin, or their mixtures.

A thirteenth embodiment of the present invention provides that, in any of the methods of embodiments one through twelve, the solvent is an aliphatic, aromatic or cyclic, saturated or unsaturated hydrocarbons, alcohols, carboxyl acids, amines, esters, ketones, aldehydes, ethers, water, tetrahydrofurane, dimethylformide, dimethylsulfoxide, n-methylpyrrolidone, n-methylcaprolactam, or a mixture thereof.

A fourteenth embodiment of the present invention provides that, in any of the methods of embodiments two, three, and six, the utilized gas is a saturated or unsaturated hydrocarbon, nitrogen, nitrous oxide, halogenated hydrocarbons, ammonia, inert gases, or a mixture thereof.

A fifteenth embodiment of the present invention provides that, in any of the methods of embodiments one through fourteen, the method is suitable for reprocessing used plastics.

DETAILED DESCRIPTION

The present invention is a method for separating polymer mixtures by means of liquid-liquid separation. The method can further include subsequent liquid chromatography.

Figure 2:
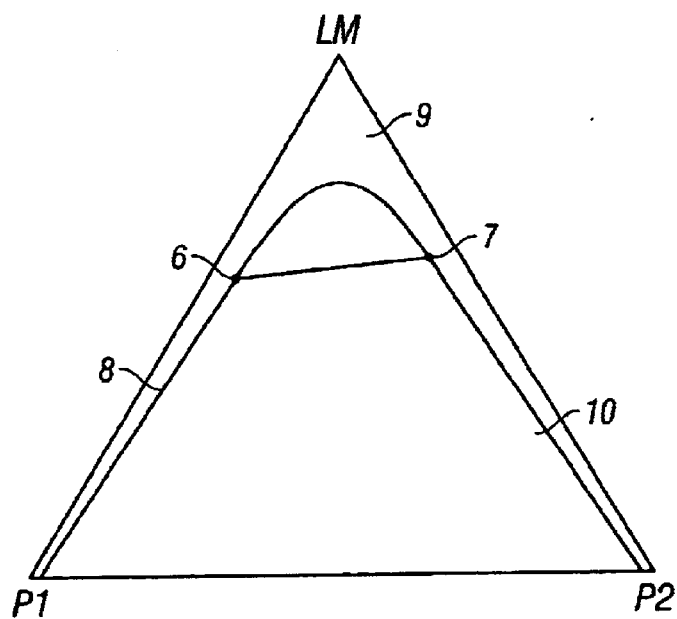
FIG. 2 is a schematic diagram illustrating a phase reaction in the system polymer 1/polymer2/solvent.

In an initial step, polymers P1 and P2 with a total polymer content of 1–50 wt. %, preferably 5–20 wt. %, are dissolved in a suitable solvent. By choosing the pressure and temperature conditions, and in a variant of the method by adding a gas, a segregation in accordance with FIG. 2 occurs. Thus, two liquid phases (points 6 and 7 in FIG. 2) result, which due to the low total polymer content in the solution are rich in solvent and therefore both have low viscosity.

In each of phases 6 and 7, a single polymer is accumulating (polymer P1 in phase 6; polymer P2 in phase 7), while the other is present in lower concentrations.

Phases 6 and 7 are separated from one another and each fraction is separately subjected to the second step.

In the second step of the method in accordance with the invention, shown here in connection with fraction 6, an additional phase separation in accordance with drawing 3 results by adjusting the temperature and pressure and, in a variant of the method, by adding a gas.

Figure 3:
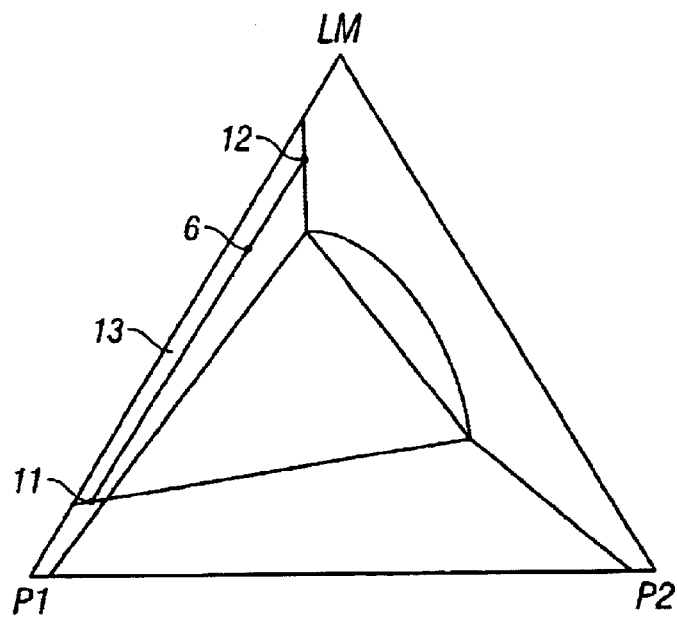
FIG. 3 is a schematic diagram illustrating a phase behavior in the system polymer 1/polymer2/solvent with separation in the binary boundary system polymer 1 (P1)—solvent (LM).

By means of phase separation in the binary system polymer P1—solvent (LM) a two-phased area (13) is also induced in the ternary system. In this manner, two phases result (points 11 and 12 in FIG. 3) from point 6, one of which (11) has high viscosity and contains polymer P1 with a higher degree of purity than polymer P2, the other (12) however, consists mainly of the solvent (LM) as well as polymers P1 and P2 in more diluted form and therefore having low viscosity. In this connection, it must be taken into consideration that FIG. 3 is completely schematic for reasons of clarity and that the achievable degree of purity for polymers P1 and P2 is significantly greater than shown. The low viscosity of phase 12 facilitates problem-free mechanical separation of both phases.

In a third step, which is particularly useful when a particularly high degree of purity of polymer P1 is necessary, phase 11 is subjected to liquid chromatography. In this manner, due to the low content of the interfering polymer P2, the method is designed so that these components irreversibly adhere to the column while the other components (P1) pass through the column.

Figure 4:
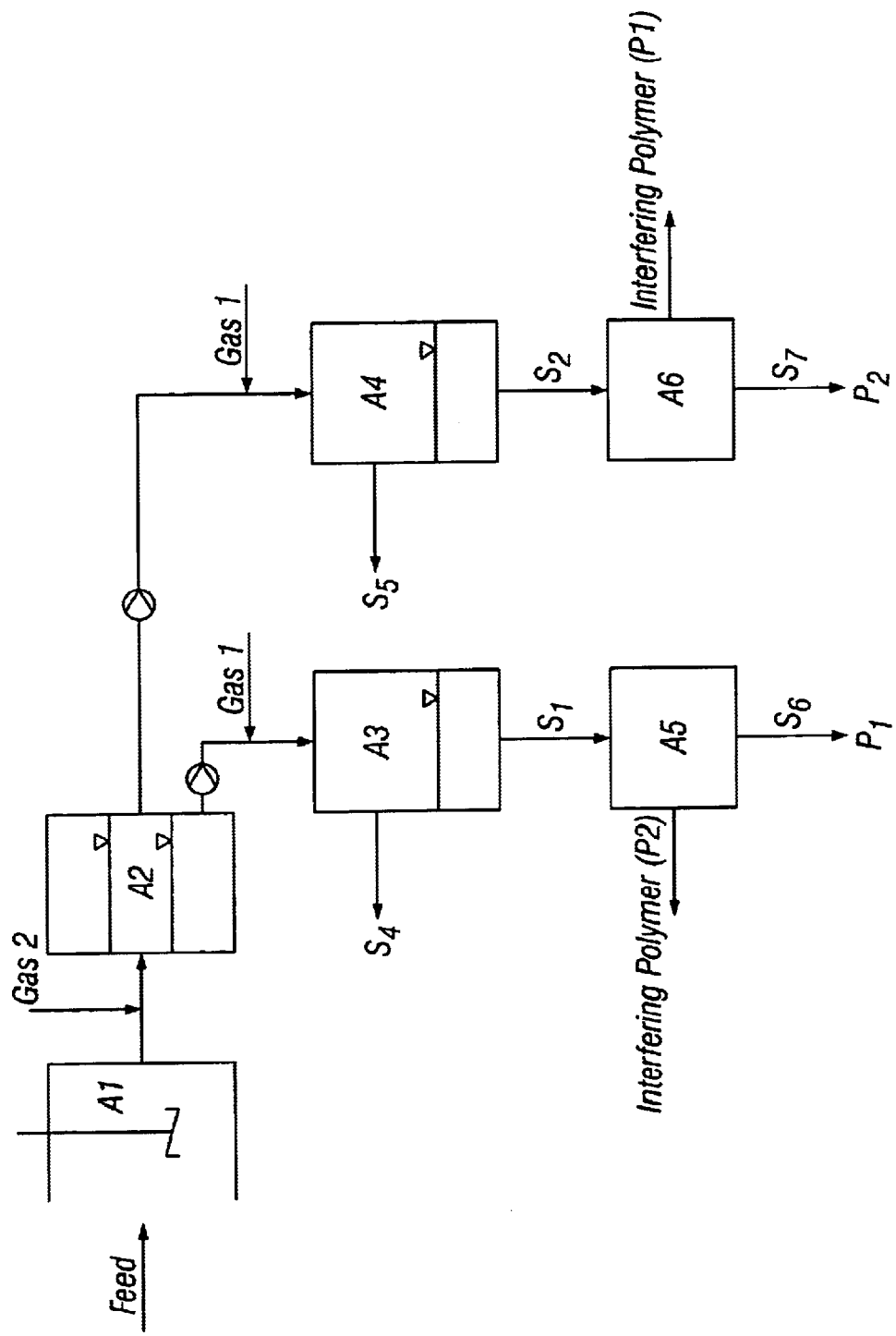
FIG. 4 is a schematic diagram of a polymer separation facility.

Operatively, the described method can be executed as follows (FIG. 4).

The polymers to be separated are dissolved in a solvent having a total weight fraction of preferably between 5–25 wt. % (device A1).

Under suitable temperature and pressure conditions or with the addition of a compressed gas or with the combination of all three factors, two (or more) liquid phases result, each of which contain predominantly one of the polymers as well as small amounts of the other polymers. Due to the relatively low polymer content (5–25 wt. %), the viscosity of the mixture still allows for a separation of the phases (device A2).

Finally, starting with the homogeneous fractions, another phase separation is induced under suitable pressure and temperature conditions and with the possible addition of gas. During this phase separation, besides a solvent-rich, low viscosity phase, a phase which contains a single polymer with a high degree of purity (with respect to the solvent-free polymer) (95–99.99 wt. %) is formed (devices A3 and A4). The solvent rich phase contains small amounts of the same polymer, in particular the short chain portion, as well as amounts of the interfering polymers. By choosing the appropriate gas content or the temperature, the time necessary to settle 99 wt. % of the phases is advantageously shortened. The solvent-rich phase is channeled out as a split flow S4 or S5. The highly pure polymers are removed as product flows S1 or S2, and if necessary are led to the liquid chromatography (devices A5 and A6) to increase the degree of purity (99–100%). The chromatography conditions are chosen in such a manner that the main components, polymer P1 or P2, are not retarded, while the interfering polymer P2 or P1 irreversibly adhere to the respective column.

Polymers P1 and P2 are retrieved in solution as product flows S6 and S7.

The solvent and the gas could be re-used after being cleaned. Besides the injection of the gas into device A3 and A4 (gas1), direct injection into device A2 (gas2) is also possible. In this manner, already in that process step, the viscosity of the mixture would be significantly reduced.

The method according to the invention can be used for all thermoplastic or non cross-linked polymers. The method is also suitable for biological polymers.

The solvent in which the polymers that are to be separated are dissolved is chosen in such a manner that:

sufficient solubility of the polymer is achieved to design the method in a cost efficient manner;

it sufficiently dissolves the gas that is to be used at moderate pressures;

separation occurs at moderate temperatures in connection with the gas that is to be used;

the mixing with the elution agents of the liquid chromatography is possible and it does not lead to the precipitation of one or both polymers;

no strong interactions with the stationary phase of the liquid chromatography occur;

it can be cost efficiently removed from the product flow using conventional methods such as evaporation or precipitation;

it does not disturb the detection of the polymer that must be eluted; and it remains chemically stable in the method according to the invention and, to the extent possible, it does not cause corrosion.

The compressed gas is chosen in such a manner that:

it does not dissolve the polymers that are to be separated;

it dissolves sufficiently in the polymer solution at moderate pressure;

in connection with the solvent that is to be used, a separation occurs at moderate temperatures; and it can easily be removed from the system when pressure is lowered.

The mobile phase of the chromatography is chosen in such a manner that:

it, in conjunction with the stationary phase, leads to the separation scheme in accordance with the invention;

no large-scale elimination effects are facilitated;

a polymer will be irreversibly retained while the other is eluted; and it remains chemically stable in the method according to the invention and, to the extent possible, it does not cause corrosion.

The stationary phase of the chromatography is chosen in such a manner that:

one of the two polymers is retained;

the pore size suffices for interactions with polymers;

no large-scale elimination effects are facilitated;

the dissolved additives are also separated; and different particle sizes that are sufficiently mechanically stable are available for technical separation.

EXAMPLES

The application of the method according to the invention is demonstrated by the following examples.

Example 1

Separation of Two Polymers in a Common Solvent by Raising the Temperature

A solution consisting of 50 g polystyrene, 1 g LDPE and 400 g cyclohexane is heated in an autoclave at a temperature of 235° C. whereby a pressure of 22 bar absolute results. The polystyrene rich phase contains approximately 34 wt. % polymer; the solvent phase contains approximately 2 wt. % mixed polymer. The polymer rich phase has a polystyrene content in the mixed solvent-free polymer of >99.9 wt. %.

Example 2

Separation of Two Polymers in a Common Solvent by Using Compressed Gas

Polystyrene and low density polyethylene LDPE are dissolved in cyclohexane at approximately 80° C. This solution splits into two liquid phases, one of which contains approximately 98 wt. % polystyrene from the mixed polymer. This phase contains approximately 50 g polystyrene, 1 g LDPE and 400 g cyclohexane. It is obtained by decanting and is transferred to an autoclave. By dissolving carbon dioxide at pressures above 61 bar absolute at a temperature of 80° C., a polymer-rich liquid phase with approximately 40 wt. % mixed polymer and a solvent-rich phase with approximately 1 wt. % mixed polymer are formed. The polymer-rich phase has a polystyrene content in the mixed polymer of >99.9%.

Example 3

Decreasing Settling Time for Two Liquid Phases by Compressing a Gas

Carbon dioxide is dissolved at a pressure measuring 68 bar in a solution containing 50 g polystyrene, 1 g LDPE and 400 g cyclohexane. Two liquid phases are formed.

After stopping the mixing apparatus, a settling of the phases follows within a few seconds. Complete purification can be observed after 7 minutes for the polymer-poor phase and for the polymer-rich phase after 13 minutes. These values lie significantly below 20 minutes, which is the longest time generally indicated as being acceptable for liquid-liquid phase separation on an industrial scale.

Example 4

Chromatography with Irreversible Component Adsorption

With an HPLC the following chromatographic scheme for separating polystyrene (PS) with a weight average molecular weight of 100 kg/mol and bisphenol-A polystyrene (PS) with a weight average molecular mass of 17 kg/mol was observed.

The separation is implemented on the stationary phase LiChrospher™ Si 60 (available from Merck KgaA, Darmstadt, Germany) with particle size 5 $\mu$m at T=25° C. in a column with a diameter of 4 mm and a length of 250 mm. The solvent is dichloromethane, the mobile phase is also dichloromethane. The liquids used were of the quality classification "HPLC grade".

In the described column, 10 $\mu$l sample volumes were injected at a flow rate of the mobile phase of 1 ml/min. The mobile phase consisted of the solvent and 1 mg polymer/ml solvent. The polymer consists of PS and polycarbonate ("PC") that have been mixed in a weight ratio of 1:1 from the pure materials.

In this experiment PC was irreversibly absorbed and PS eluted with dead time.

Example 5

Formation of at Least Two Liquid Phases 5 g polystyrene, 5 g LDPE and 5 g PVC are dissolved at 140° C. under boiling conditions in 85 g paraxylene in a glass flask using a magnetic stirrer. After turning off the stirrer, three liquid phases form, each of which contains a single polymer in enriched form.

Example 6

Formation of at Least Two Liquid Phases 5 g polystyrene, 5 g LDPE and 5 g polypropylene, 5 g LLDPE and 5 g PVC are dissolved at 140° C. under boiling conditions in 75 g paraxylene in a glass flask using a magnetic stirrer. After turning off the stirrer, three liquid phases form, each of which contains either the polystyrene, the polyolefin or the PVC in enriched form.

Example 7

Formation of at Least Two Liquid Phases 5 g polystyrene, 5 g HDPE, 5 g LDPE and 5 g polypropylene are dissolved at 150° C. in 80 g cyclohexane in a stirred glass autoclave. After turning off the stirrer, two liquid phases form, each of which contain either the polystyrene or the polyolefin in enriched form.

Example 8

Separation of Two Polymers in a Common Solvent by Using Compressed Gas

Polystyrene and LDPE are dissolved in cyclohexane at approximately 80.7° C. This solution splits into two liquid phases, one of which one contains approximately 98 wt. % polystyrene from the mixed polymer. This phase contains approximately 50 g polystyrene, 1 g LDPE and 400 g cyclohexane. It is extracted by decanting and transferred to an autoclave. By dissolving carbon dioxide at pressures above 61 bar at a temperature of 80° C., two phases are once more formed: a polymer-rich liquid phase with approximately 40 wt. % polymer, and a solvent-rich phase with approximately 1 wt. % polymer. The polymer rich phase contains >99.9 wt. % polystyrene.

Example 9

Decreasing Settling Time for Two Liquid Phases by Using a Compressed Gas

The settling time in example 7 was determined to be longer than one hour. When carbon dioxide is dissolved at 68 bar of pressure, complete purification for the polymer-poor phase occurs after 7 minutes and after 13 minutes for the polymer-rich phase. These values lie significantly below 20 minutes, which is the longest time generally indicated as being applicable for liquid-liquid phase separation on an industrial scale.

Example 10

Decanting and Separating with a High Degree of Purity

Figure 1:
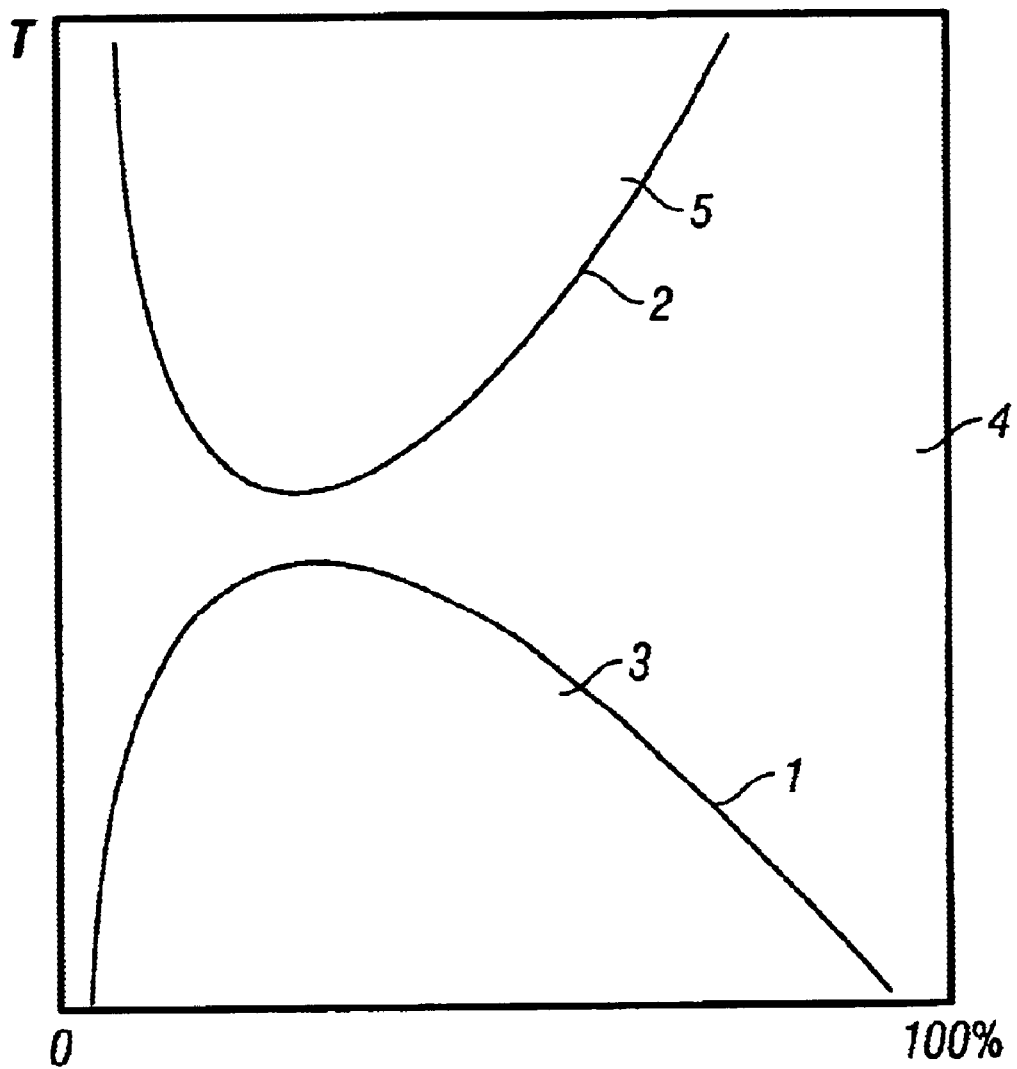
FIG. 1 is graph illustrating polymer solubility in relation to temperature.

At 140° C. in a glass autoclave made of special glass from the firm Schott clamped in between two stainless steel flanges and tempered in a laboratory oven made by the firm Heraeus, 10 g poly (1-butane) and 10 g polypropylene are dissolved using a flat paddle agitator in n-pentane under pressure. The liquid phases to be segregated after the agitator has been turned off are separated by decanting. They each contain one of the polymers in enriched form. The homogenous solutions obtained are transferred to two other glass autoclaves of the same type installed in the same thermostat oven. There the temperature is adjusted to 162.5° C. for both solutions which in both cases suffices to exceed the lowest critical separation temperature (LCST) for the pure polymer with the solvent (see boundary (2) in FIG. 1 as explained above). The polymer-rich phase is drained using ball valves of the type Whitey Series TF, and the solvent is separated using flash evaporation. The products obtained in this manner contain polypropylene and poly (1-butane) with a high degree of purity.

Example 11

Decanting and Separating with a High Degree of Purity

In the apparatus described in example 10, 11.5 g polystyrene and 12.1 g HDPE are dissolved in 74.8 g pentyl acetate at 160° C. After turning off the agitator, the liquid phases are separated from each other using decanting. The phase enriched with HDPE is transferred to one of the above-described autoclaves. By lowering the temperature to 129.5° C., it will fall below the upper critical separation temperature (UCST) for the pure HDPE with the solvent (see boundary (1) in FIG. 1). Two liquid phases are formed. The polymer-rich phase is separated as described above.

The product contains HDPE at >99 weight percent purity.

Example 12

Decanting and Separating with a High Degree of Purity 11.9 g polystyrene and 11.8 g HDPE are dissolved in 81.2 g butyl acetate at 140° C. After turning off the agitator, the liquid phases are separated, as described in example 11, and transferred to the two next autoclaves. Then the thermostat oven is heated to 234.6° C. Two liquid phases are observed in the solution enriched with HDPE because the LCST for pure HDPE with butyl acetate was exceeded, while the other solution, which was enriched with polystyrene, remains homogenous. The polymer rich phase containing HDPE is separated. An HDPE degree of purity of >99.5 weight percent was shown. The polystyrene enriched phase in the third autoclave is heated to 246.1° C. The polymer rich phase that is segregated as a result thereof is then removed. Polystyrene having a purity of >99.5 weight percent results.

Example 13

Decanting and Separating With a Higher Degree of Purity With a Change of Solvent 9.8 g HDPE, 12.2 g polypropylene and 10.1 g PVC are dissolved in paraxylene at 140° C. in a glass flask that is operated under normal pressure. Two liquid phases form. The heavy phase contains PVC in enriched form and is extracted using decanting with subsequent evaporation. The upper phase containing the polyolefins is similarly extracted and evaporated. The solid material obtained is filled into a stainless steel autoclave fitted with sapphire windows and is mixed with 69.2 g n-pentane. The mixture is heated to 152.8° C. Two liquid phases are formed in this manner. The upper phase is completely removed via an immersing stainless steel pipe. It contains polypropylene in enriched form. After heating to 197.8° C. the heavier of the two liquid phases is removed via a second immersing stainless steel pipe and dried. The product contains HDPE with a degree of purity of >82 weight percent.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for separating a technical or biological polymer mixture comprising the steps of:

dissolving the mixture in one of a solvent and a solvent mixture such that a resulting solution contains 1–50 wt. % total polymer and such that at least two liquid phases are formed, wherein the polymers are technical or biological macro molecules with a number average molecular weight of greater than 1000 g/mol and less than 1000 kg/mol and are at least partially soluble in at least one suitable solvent, wherein the mixture is not completely miscible, and
wherein the one of a solvent and a solvent mixture has an atmospheric boiling point between 30° C. and 250° C.;

decanting the liquid phases such that homogenous fractions are formed in which one of a polymer and a group of chemically similar polymers is present in increased concentration,
wherein the one of a polymer and a group of chemically similar polymers is a target polymer;

subjecting the homogeneous fractions to pressures and temperatures at which the target polymer with the solvent forms two liquid phases so that the fractions separate into at least two phases, of which a first phase is a liquid polymer rich phase that contains the target polymer with a high degree of purity and of which a second phase is a polymer poor liquid phase;

separating the polymer rich phase; and extracting the target polymer.

2. A method for separating a technical or biological polymer mixture comprising the steps of:

dissolving the mixture in one of a solvent and solvent mixture such that a resulting solution contains 1–50 wt. % total polymer and such that at least two liquid phases are formed,
wherein the polymers are technical or biological macro molecules with a number average molecular weight of greater than 1000 g/mol and less than 1000 kg/mol and are at least partially soluble in at least one suitable solvent,
wherein the mixture is not completely miscible, and
wherein the one of a solvent and a solvent mixture has an atmospheric boiling point between 30° C. and 250° C.;

decanting the liquid phases such that homogenous fractions are formed in which one of a polymer and a group of chemically similar polymers is present in increased concentration,
wherein the one of a polymer and a group of chemically similar polymers is a target polymer;

mixing the fractions with one of a compressed gas and a gas mixture such that at least two liquid phases are formed and such the fractions are separated into at least two liquid phases, of which a first phase is a polymer-rich phase that contains the target polymer with a high degree of purity and of which a second phase is a polymer-poor liquid phase,
wherein the one of a compressed gas and a gas mixture is a one of a substance and a substance mixture that is available at 1 bar absolute and at 25° C. in a gaseous state.

3. A method for separating a technical or biological polymer mixture comprising the steps of:

dissolving the polymer mixture in a mixture of at least one solvent and one gas, such that a resulting solution contains 1–50 wt. % total polymer and such that at least two liquid phases are formed,
wherein the polymers are technical or biological macro molecules with a number average molecular weight of greater than 1000 g/mol and less than 1000 kg/mol and are at least partially soluble in at least one suitable solvent,
wherein the mixture is not completely miscible, and
wherein the one of a solvent and a solvent mixture has an atmospheric boiling point between 30° C. and 250° C.;

decanting the liquid phases such that homogenous fractions are formed in which one of a polymer and a group of chemically similar polymers is present in increased concentration,
wherein the one of a polymer and a group of chemically similar polymers is a target polymer;

mixing one or more fractions with one of another compressed gas and another gas mixture,
wherein the one of another compressed gas and another gas mixture is one of a substance and a substance mixture that is available at 1 bar absolute and at 25° C. in a gaseous state;

subjecting the fractions, obtained in accordance with the step of mixing, to pressures and temperatures at which the target polymer with the solvent forms two liquid phases so that the fractions separate into at least two liquid phases, of which a first phase is a polymer-rich phase that contains the target polymer in a high degree of purity and of which a second phase is a polymer-poor phase;

separating the polymer-rich phase; and extracting the target polymer.

4. A method for separating a technical or biological polymer mixture comprising the steps of:

dissolving the mixture in one of a solvent and a solvent mixture such that a resulting homogeneous solution contains 1–50 wt. % total polymer,
wherein the polymers are technical or biological macro molecules with a number average molecular weight of greater than 1000 g/mol and less than 1000 kg/mol and are soluble in at least one suitable solvent,
wherein the mixture is not completely miscible, and
wherein the one of a solvent and a solvent mixture has an atmospheric boiling point between 30° C. and 250° C.;

exposing the resulting solution to rising temperatures so that the polymers in the resulting solution are subjected to the following subsequent steps:
exceeding a temperature above which a respective polymer with the pure solvent forms two liquid phases so that the solution separates into at least two liquid phases, of which a first phase is a liquid polymer-rich phase that contains the respective enriched polymer and of which a second phase is a polymer-poor phase, wherein the respective enriched polymer is a target polymer;
separating the polymer-rich phase
extracting the target polymer; and
subjecting the polymer-poor phase to the steps of exceeding, separating, and extracting until all desired polymers are separated.

5. A method for separating a technical or biological polymer mixture comprising the steps of:

dissolving the mixture in one of a solvent and a solvent mixture such that a resulting homogenous solution contains 1–50 wt. % total polymer and such that at least two liquid phases are formed,
wherein the polymers are technical or biological macro molecules with a molecular weight of greater than 1000 g/mol and less than 1000 kg/mol and are soluble in at least one suitable solvent,
wherein the mixture is not completely miscible, and
wherein the one of a solvent and a solvent mixture has an atmospheric boiling point between 30° C. and 250° C.;

exposing the resulting solution to falling temperatures so that the polymers in the resulting solution are subjected to the following subsequent steps:
lowering the temperature below a point at which a respective polymer with the pure solvent forms two liquid phases, so that the solution separates into at least two liquid phases, of which a first phase is a polymer-rich phase that contains the respective enriched polymer and of which a second phase is a polymer-poor phase, wherein the respective enriched polymer is a target polymer;

separating the polymer-rich phase;

extracting the target polymer; and subjecting the polymer-poor phase to the steps of lowering, separating, and extracting until all desired polymers are separated.

6. A method for separating a technical or biological polymer mixture comprising the steps of:

dissolving the mixture in one of a solvent and a solvent mixture such that a resulting homogenous solution contains 1–50 wt. % total polymer, wherein the polymers are technical or biological macro molecules with a number average molecular weight of greater than 1000 g/mol and less than 1000 kg/mol and are soluble in at least one suitable solvent, wherein the mixture is not completely miscible, and wherein the one of a solvent and a solvent mixture has an atmospheric boiling point between 30° C. and 250° C.;

exposing the resulting solution to one of (a) a constant portion of one of a compressed gas and a gas mixture at a rising temperature, and (b) an increasing portion of one of a compressed gas and a gas mixture at a constant temperature, such that the polymers in the resulting solution are subjected to the following subsequent steps:

exceeding one of a temperature and a gas content, above which a respective polymer with the pure solvent and the one of a gas and a gas mixture forms two liquid phases, such that the solution separates into at least two phases, of which a first phase is a liquid polymer-rich phase that contains the respective enriched polymer and of which the second phase is a liquid polymer-poor phase, wherein the respective enriched polymer is a target polymer;

separating the polymer-rich phase;

extracting the target polymer; and exposing the polymer-poor phase to the steps of exceeding, separating, and extracting until all desired polymers are separated, wherein the one of a gas and a gas mixture is one of a substance and a substance mixture that is available at 1 bar absolute and at 25° C. in a gaseous state.

7. A method in accordance with claims 1, 2, 3, 4, 5 or 6 wherein the polymers to be separated are co-polymers with various co-monomer content.

8. A method in accordance with claims 1, 2, 3, 4, 5 or 6 wherein the short chain content of the molecular weight distribution of the enriched polymer accumulates with an increased degree of purity in the solvent-rich phase and therefore is depleted in the polymer-rich phase.

9. A method in accordance with claims 1, 2 or 3 wherein after the step of decanting, the homogeneous fraction which contains one of a single polymer and a group of chemically similar polymers, after drying of the initial solvent or without any other processing, is dissolved in another solvent or solvent mixture.

10. A method in accordance with claims 1, 2, or 6 wherein gas content and temperature are chosen such that the time needed until 99 wt. % of the substances have settled in phases has been reduced to under 20 minutes.

11. A method in accordance with claims 1, 2, 3, 4, 5 or 6 wherein the polymers are one of thermoplastics and a mixture thereof.

12. A method in accordance with claims 1, 2, 3, 4, 5 or 6 wherein the polymers are one of polystyrene, polyvinyl chloride, polyolefin, and a mixture thereof.

13. A method in accordance with claims 1, 2, 3, 4, 5 or 6 wherein the solvent is one of an aliphatic, aromatic or cyclic, saturated or unsaturated hydrocarbons, alcohols, carboxyl acids, amines, esters, ketones, aldehydes, ethers, water, tetrahydrofurane, dimethylformide, dimethylsulfoxide, n-methylpyrrolidone, n-methylcaprolactam, and a mixture thereof.

14. A method in accordance with claims 2, 3 or 4 wherein a utilized gas is one of a saturated or unsaturated hydrocarbon, nitrogen, nitrous oxide, halogenated hydrocarbons, ammonia, inert gases, and a mixture thereof.

15. A method in accordance with claims 1, 2, 3, 4, 5 or 6 wherein the resulting solution contains solution contains 5–25 wt. % total polymer.

16. A method for separating a polymer mixture, wherein the polymer mixture includes a first polymer and a second polymer, the method comprising the steps of:

dissolving the polymer mixture in a solvent;

inducing a first phase separation in the polymer mixture to produce a first liquid phase and a second liquid phase, such that the first liquid phase contains more of the first polymer than the second polymer, and such that the second liquid phase contains more of the second polymer than the first polymer;

separating the first liquid phase from the second liquid phase;

inducing a second phase separation in the first liquid phase to produce a third liquid phase and a fourth liquid phase, such that the third liquid phase has a viscosity higher than that of the fourth liquid phase, and such that the first polymer of the third liquid phase has a higher degree of purity than the second polymer of the third liquid phase; and inducing a second phase separation in the second liquid phase to produce a fifth liquid phase and a sixth liquid phase, such that the fifth liquid phase has a viscosity higher than that of the sixth liquid phase, and such that the second polymer of the fifth liquid phase has a higher degree of purity than the first polymer of the sixth liquid phase.

17. The method of claim 16, further comprising the step of subjecting one of the third liquid phase and the fifth liquid phase to liquid chromatography.

18. The method of claim 16, wherein the step of inducing a first phase separation comprises at least one of the steps of adjusting a pressure applied to the dissolved polymer mixture, adjusting a temperature applied to the dissolved polymer mixture, and adding a gas to the dissolved polymer mixture.

19. The method of claim 16, wherein the step of inducing a second phase separation in the first liquid phase comprises at least one of the steps of adjusting a pressure applied to the first liquid phase, adjusting a temperature applied to the first liquid phase, and adding a gas to the first liquid phase.

20. The method of claim 16, wherein the step of inducing a second phase separation in the second liquid phase comprises at least one of the steps of adjusting a pressure applied to the second liquid phase, adjusting a temperature applied to the second liquid phase, and adding a gas to the second liquid phase.

* * * * *